United States Patent
Ogura et al.

(10) Patent No.: US 7,512,042 B2
(45) Date of Patent: Mar. 31, 2009

(54) METHOD OF CONTROLLING FOCUS OF OPTICAL DISK RECORDING AND REPRODUCING DEVICE

(75) Inventors: Hitoshi Ogura, Isesaki (JP); Tsuyoshi Yamamoto, Ota (JP); Koji Tsukagoshi, Fukaya (JP); Hideki Osawa, Fukaya (JP); Yasushi Hanamoto, Hanyu (JP); Yasuki Mori, Ora-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 616 days.

(21) Appl. No.: 11/181,306

(22) Filed: Jul. 14, 2005

(65) Prior Publication Data

US 2006/0013082 A1 Jan. 19, 2006

(30) Foreign Application Priority Data

Jul. 16, 2004 (JP) .............................. 2004-210033
Jul. 26, 2004 (JP) .............................. 2004-217428

(51) Int. Cl.
*G11B 7/00* (2006.01)
(52) U.S. Cl. ................................. 369/44.27; 369/44.25
(58) Field of Classification Search .............. 369/44.27, 369/44.25
See application file for complete search history.

(56) References Cited

U.S. PATENT DOCUMENTS 5,831,953 A * 11/1998 Numata ................... 369/53.23
6,021,102 A * 2/2000 Seto et al. ................ 369/53.23

FOREIGN PATENT DOCUMENTS

JP 10-188457 7/1998

* cited by examiner

*Primary Examiner*—Wayne R Young
*Assistant Examiner*—Van N Chow
(74) *Attorney, Agent, or Firm*—Pillsbury Winthrop Shaw Pittman LLP (57) ABSTRACT

In an optical disk recording and reproducing device which uses an optical disk having at least a first recording layer and a second recording layer, a thickness of a spacer section between the first recording layer and the second recording layer is measured, an amount of defocus with respect to the second recording layer is set based on the measured spacer thickness, and a focus servo operation is performed for focusing the laser light irradiated from an optical pickup device on the second recording layer.

13 Claims, 4 Drawing Sheets

FIG. 5

METHOD OF CONTROLLING FOCUS OF OPTICAL DISK RECORDING AND REPRODUCING DEVICE

CROSS-REFERENCE TO RELATED APPLICATIONS

The entire disclosure of Japanese Patent Application Nos. 2004-210033 and 2004-217428, including specification, claims, drawings and abstract, is incorporated herein by reference.

BACKGROUND OF THE INVENTION

1. Field of the Invention

The present invention relates to a method for controlling focus in an optical disk recording and reproducing device which performs a reproducing operation of a signal recorded on an optical disk using laser light irradiated from a laser diode incorporated in an optical pickup device or a recording operation of a data signal to the optical disk.

2. Description of the Related Art

An optical disk recording and reproducing device has been made commercially available which performs a reproducing operation of a signal recorded on an optical disk using laser light irradiated from a laser diode and a recording operation of a signal to the optical disk. A typical optical disk recording and reproducing device uses an optical disk which is called a "CD" and another typical optical disk recording and reproducing device uses an optical disk which is called a "DVD".

Because there is a strong demand for recording a larger amount of signals on an optical disk, currently, there is a shift from CD to DVD. Among DVD disks, an optical disk called a dual layer disk has been developed in which two recording layers are provided instead of one recording layer.

A technique has been developed in which laser light irradiated from an optical pickup device is focused on each signal layer in an optical disk recording and reproducing device which uses the dual layer disk.

The operation to control focus for focusing the laser light irradiated from the optical pickup device on two signal layers assuming that the placement of the recording layers of the optical disk is accurate, that is, the physical characteristics of the optical disk conform with the standard.

An optical disk of a DVD system is created by adhering two disks of a predetermined thickness (0.6 mm). As a result, although it is possible to achieve approximate uniform thickness for a cover layer provided between the surface of the optical disk and the first recording layer, the thickness of a spacer section which is the adhering portion of the two disks, that is, the spacer section provided between the first and second recording layers may not be uniform and may vary from one disk to another. As a result, there is a problem in that it is not possible to accurately perform a focus servo operation with an amount of defocus which is set with respect to the first and second recording layers.

In addition, in each optical disk, the thickness of the space section is not uniform over the optical disk. In particular, the thickness of the spacer section may vary significantly between an inner side and an outer side. Thus, there is a problem in that it is not possible to accurately perform a focus servo operation on the overall optical disk.

SUMMARY OF THE INVENTION

According to one aspect of the present invention, there is provided a method of controlling focus in an optical disk recording and reproducing device which uses an optical disk having at least a first recording layer and a second recording layer and which performs recording and reproducing operations for a signal using laser light irradiated from a side of the first recording layer, wherein a thickness of a spacer section present between the first recording layer and the second recording layer is measured, an amount of defocus with respect to the second recording layer is set based on the measured spacer thickness, and a focus servo operation is performed to focus laser light irradiated from an optical pickup device on the second recording layer.

BRIEF DESCRIPTION OF THE DRAWINGS

Preferred embodiments of the present invention will be described in detail based on the following drawings, wherein.

DESCRIPTION OF PREFERRED EMBODIMENTS

First Preferred Embodiment

In a first preferred embodiment of the present invention, an amount of defocus for performing the focus servo operation is set by measuring a thickness of a spacer section present between a first recording layer and a second recording layer.

Figure 1:
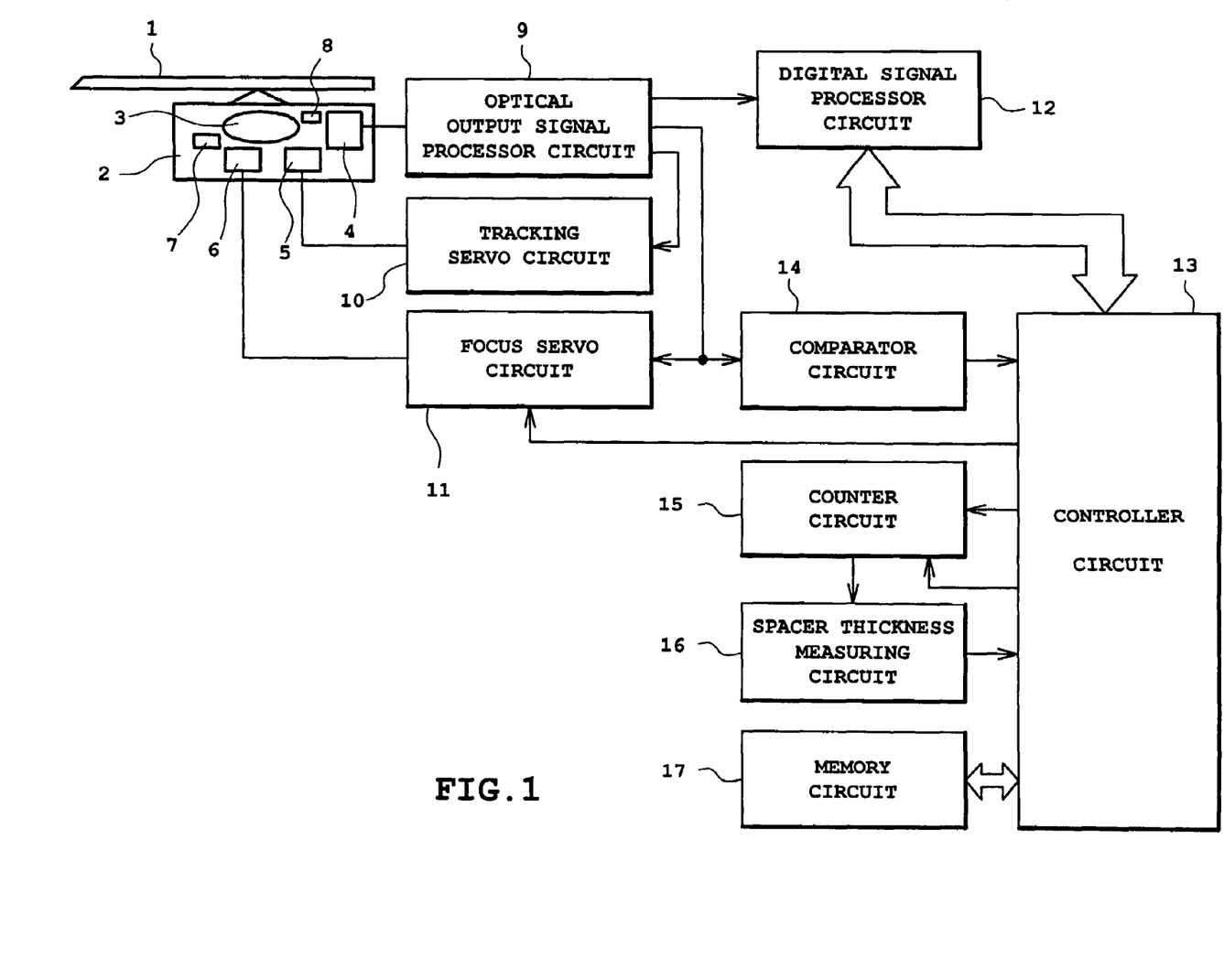
FIG. 1 is a block circuit diagram showing an optical disk recording and reproducing device according to a first preferred embodiment of the present invention.
Figure 2A:
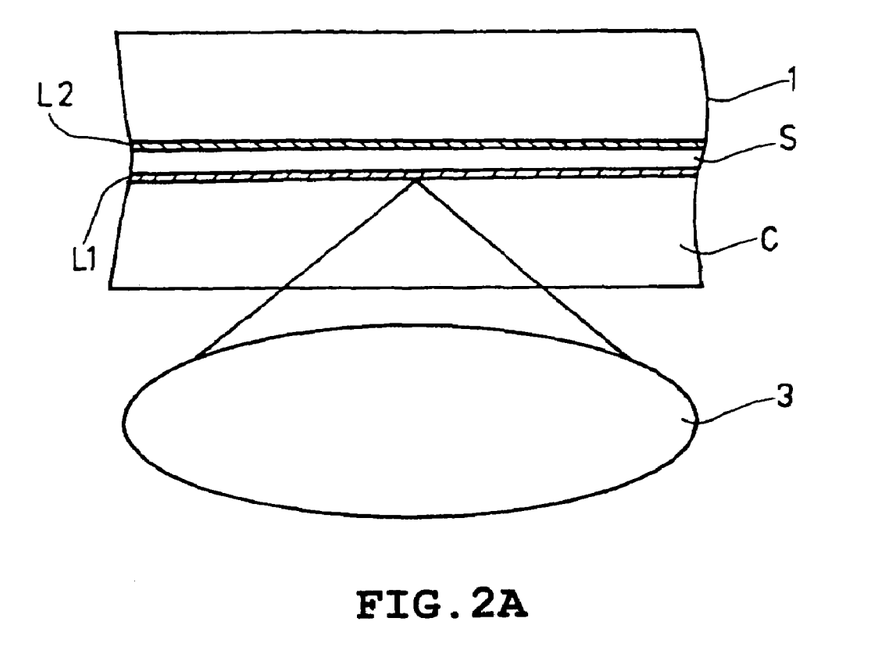
FIGS. 2A and 2B are explanatory diagrams showing a relationship between an optical disk and laser light according to the first preferred embodiment of the present invention.
Figure 2B:
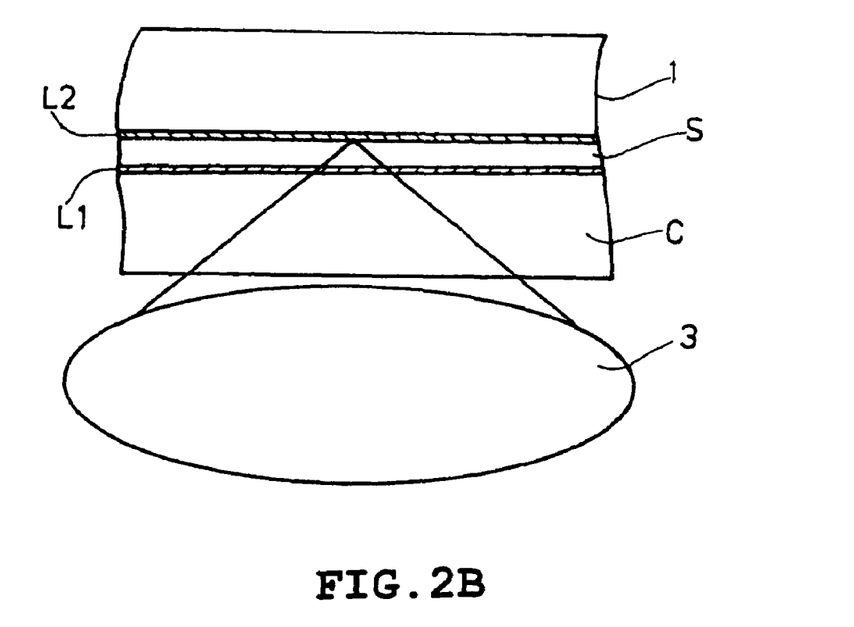
Figure 3:
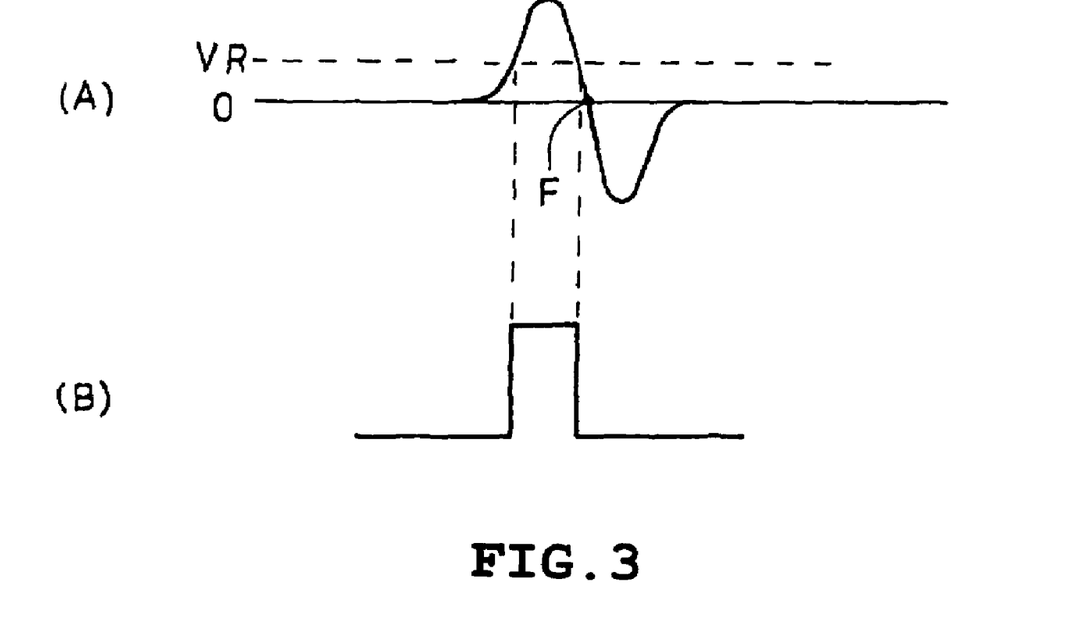
FIG. 3 is a signal waveform diagram for explaining a process in an optical disk recording and reproducing device according to a preferred embodiment of the present invention.
Figure 4:
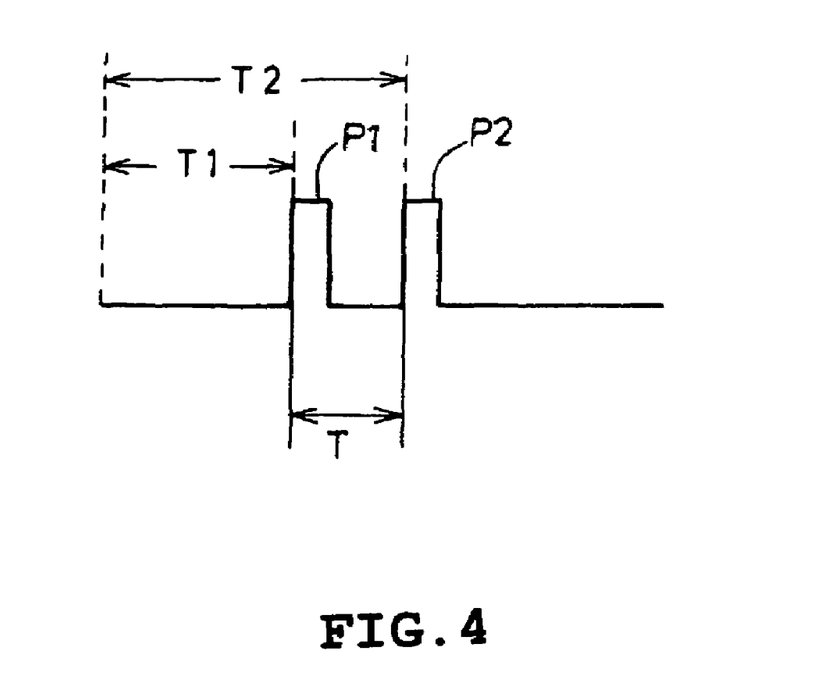
FIG. 4 is a signal waveform diagram for explaining a process in an optical disk recording and reproducing device according to a preferred embodiment of the present invention.

FIG. 1 is a block circuit diagram showing an optical disk recording and reproducing device according to the first preferred embodiment of the present invention. FIGS. 2A and 2B are explanatory diagrams showing a relationship between an optical disk and laser light. FIGS. 3 and 4 are signal waveform diagrams for explaining operations.

Referring to FIG. 1, an optical disk 1 is constructed to be rotationally driven by a spindle motor (not shown) so that the rotation is controlled such that, for example, the linear velocity is constant. As shown in FIG. 2, a first recording layer L1 and a second recording layer L2 are provided on the optical disk 1. An optical pickup device 2 comprises a laser diode (not shown) which emits laser light, an objective lens 3 for focusing the laser light irradiated from the laser diode to the recording layer of the optical disk 1, an optical detector 4, comprising a quadrant sensor or the like, which receives the laser light reflected from the optical disk 1 and converts the laser light into an electrical signal, a tracking coil 5 for displacing the objective lens 3 along a radial direction of the optical disk 1, and a focusing coil 6 for displacing the objective lens 3 in a direction perpendicular to a signal plane of the optical disk 1.

A maximum distance position defining member 7 contacts a lens holder (not shown) which supports the objective lens 3 when the objective lens 3 is furthest away from the surface of the optical disk 1 due to a supply operation of a drive signal to the focusing coil 6. The maximum distance position defining member 7 is provided to control a maximum distance position of the objective lens 3 with respect to the optical disk 1. A minimum distance position defining member 8 contacts the lens holder which supports the objective lens 3 when the objective lens 3 approaches closest to the surface of the optical disk 1 due to a supply operation of a drive signal to the focusing coil 6. The minimum distance position defining member 8 is provided to control the minimum distance position of the objective lens 3 with respect to the optical disk 1.

An electrical signal obtained from the optical detector 4 is input to an optical output signal processor circuit 9 as an optical signal. The optical output signal processor circuit 9 is constructed to generate a tracking error signal which indicates a deviation of laser light from a signal track, a focus error signal which indicates a deviation in focus of the laser light with respect to the recording layer, and a replay signal which is a read signal of the signal recorded on the optical disk 1. The operations to generate various signals in the optical output signal processor circuit 9 are performed by known circuits and will not be described in detail.

A tracking servo circuit 10 receives the tracking error signal generated by and output from the optical output signal processor circuit 9. The tracking servo circuit 10 is constructed to perform a control operation of tracking by supplying a tracking coil drive signal to the tracking coil 5 based on the input tracking error signal. A focus servo circuit 11 receives the focus error signal generated by and output from the optical output signal processor circuit 9. The focus servo circuit 11 is constructed to perform a control operation of the focus by supplying a focus coil drive signal to the focusing coil 6 based on the input focus error signal.

A digital signal processor circuit 12 receives a replay signal which is binarized by a binarization circuit provided within the optical output signal processor circuit 9. The digital signal processor circuit 12 is constructed to apply digital signal processing to the input signal to decode various signals. A controller circuit 13 controls various operations of the optical disk recording and reproducing device. The controller circuit 13 is constructed to control a rotation control operation of the optical disk 1 by the spindle motor and processing operations of the replay signal and the recording signal using a synchronization signal generated by the digital signal processor circuit 12 and transmission/reception operations of signals to and from a host device such as a personal computer which is externally provided. The controller circuit 13 is formed by a microcomputer and is constructed to perform various control operations based on program software stored in a ROM or the like which is provided internally.

A comparator circuit 14 receives the focus error signal output from the optical output signal processor circuit 9. The comparator circuit 14 is constructed to output, to the controller circuit 13, a signal of H (high) level for a period in which the level of the focus error signal exceeds a threshold value VR. A graph (A) in FIG. 3 shows a relationship between the focus error signal and the threshold value VR which is obtained when the objective lens 3 is moved to approach from a position distant from the recording layer provided on the optical disk 1. As is known in the art, the focus error signal changes in an S-shape. When the optical disk 1 comprises two layers, two S-shaped changes occur. A graph (B) in FIG. 3 shows a pulse signal output from the comparator circuit 14, and a signal of H level is output for a period in which the level of the focus error signal exceeds the threshold value VR.

An operation of a counter circuit 15 is controlled by the controller circuit 13. The counter circuit 15 is constructed to start a counting operation when a pulse signal is output from the comparator circuit 14 and to measure a period between a first pulse signal and a next pulse signal when the next pulse signal is output. For example, it is possible to provide a clock signal generating circuit which generates a clock signal of a predetermined frequency and measure the period using a number of clock signals which are counted between the pulse signals.

A spacer thickness measuring circuit 16 determines a thickness of a spacer section S provided between the first recording layer L1 and the second recording layer L2 based on a number of clock signals counted by the counter circuit 15. Because the thickness of the spacer section S can be calculated from a relationship between the number of clock signals and the thickness which is determined in advance, the spacer thickness measuring circuit 16 can output data based on the calculated thickness to the controller circuit 13.

An operation of a memory circuit 17 is controlled by the controller circuit 13. The memory circuit 17 stores, as table data, data indicating an amount of defocus with respect to the thickness of the spacer section S. A control operation for focus of laser light irradiated from the optical pickup device 2 to the optical disk 1 will now be described. When a focus coil drive signal is supplied from the focus servo circuit 11 to the focusing coil 6, the objective lens 3 is displaced in a direction perpendicular to the plane of the optical disk 1 and a focus error signal having an S-shape as shown in the graph (A) of FIG. 3 is generated by and output from the optical output signal processor circuit 9. A zero-cross point F of the S-shaped focus error signal is the point at which it is determined that the laser light irradiated on the optical detector 4 is focused from the irradiated spot of the laser light. However, it is not possible to ensure that this point is an optimum focus point with respect to the recording layer of the optical disk 1.

Specifically, the zero-cross point F of the S-shaped focus error signal may not be an optimum focus point with respect to the recording layer of the optical disk 1 because of a deviation in positional relationship between the optical disk 1 which is placed on a turntable (not shown) and the optical pickup device 2 or a difference in mounting position of various optical components in the optical pickup device 2 and the optical detector 4. In order to improve this point, a setting operation is performed for shifting the focusing point to the best position for performing the focus servo operation by the focus servo circuit 11, that is, a setting operation of an amount of defocus. The setting operation of the amount of defocus is performed by the controller circuit 13 controlling the focus servo circuit 11.

FIG. 2A is a diagram showing a state in which the focus control operation with respect to the first recording layer L1 is performed. The laser light focused by the objective lens 3 is focused on the first recording layer L1 through a cover layer C. FIG. 2B shows a state in which a focus control operation with respect to the second recording layer L2 is performed. The laser light focused by the objective lens 3 is focused on the second recording layer L2 through the cover layer C, the first recording layer L1, and the spacer section S.

The cover layer C has an approximate predetermined thickness and an amount of defocus with respect to the first recording layer L1 is set using a test disk which forms a standard during manufacturing of the optical disk recording and reproducing device. It is possible to set the amount of defocus with respect to the first recording layer L1 by adjusting the level of the drive signal to be supplied to the focusing coil 6 so that a level of a replay signal obtained from the optical detector 4 to which the laser light reflected from the test disk is irradiated is maximized. This is because as the level of the laser light reflected from the test disk is increased, the level of the replay signal is increased and the level of the reflected laser light is maximized when the focus with respect to the first recording layer is in an optimum state. Similarly, it is also possible to set the amount of defocus with respect to the first recording layer L1 by adjusting the level of the drive signal to be supplied to the focusing coil 6 so that a jitter value included in the replay signal obtained from the test disk is minimized. This is because the jitter value is minimized when the focus with respect to the first recording layer L1 is in the optimum state.

When the focus characteristics with respect to the recording operation is to be considered in addition to the setting of the amount of defocus by the above-described method, it is possible to record test signals while changing the amount of defocus with respect to the first recording layer L1 and to set, as an optimum amount of defocus with respect to the first recording layer L1, an amount of defocus which allows recording of a test signal maximizing the β value which is calculated based on a level of an RF signal obtained by reproducing the recorded signal. Specifically, the β value is calculated as β=(A1+A2)/(A1−A2) when the positive peak level of the RF signal which is the replay signal of the signal recorded on the first recording layer L1 is A1 and the negative peak level of the RF signal is A2. There is a tendency for the signal to be recorded with a better focus as the β value increases. Therefore, in order to obtain the best focus, it is possible to set the amount of defocus so that the β value is maximized.

A setting operation of the amount of defocus with respect to the second recording layer L2 is performed in a similar manner to the setting operation of the amount of defocus with respect to the first recording layer L1. A relationship between the thickness of the spacer section S present between the first recording layer L1 and the second recording layer L2 and the amount of defocus is detected and an operation is performed to store data which indicates an amount of correction with respect to the thickness in the memory circuit 17 during manufacture of the optical disk recording and reproducing device.

The amount of defocus is set through the operation as described. Next, an operation to measure a thickness of the spacer section S will be described. A focus drive signal is supplied from the focus servo circuit 11 to the focusing coil 6. The drive signal is supplied to move the objective lens 3 along a direction toward the surface of the optical disk 1 after a signal is supplied for temporarily moving the objective lens 3 in a direction moving away from the surface of the optical disk 1.

When this operation is performed, the objective lens 3 is moved from a position distant from the surface of the optical disk 1 in a direction toward the optical disk 1 while the laser light generated by the laser diode continues to be irradiated. Every time the focus point of the laser light passes the first recording layer L1 and the second recording layer L2, the focus error signal as shown in graph (A) of FIG. 3 is output from the optical output signal processor circuit 9 and a pulse signal as shown in graph (B) of FIG. 3 is output from the comparator circuit 14.

FIG. 4 shows a relationship of pulse signals output from the comparator circuit 14 when the objective lens 3 is displaced from a position distant from the optical disk 1 to a position near the optical disk 1 in order to measure the thickness of the spacer section S. A pulse signal P1 corresponds to the first recording layer L1 and a pulse signal P2 corresponds to the second recording layer L2.

When the pulse signal P1 is output from the comparator circuit 14, a control operation of the counter circuit 15 by the controller circuit 13 is performed, and, as a result, the counter circuit 15 starts to count a number of clock signals output from the clock signal generating circuit. When the next pulse signal P2 is output from the comparator circuit 14 while the counting operation is performed, a control operation of the counter circuit 15 by the controller circuit 13 is performed. Specifically, the counting operation of the clock signals by the counter circuit 15 is stopped and the number of clock signals that are counted from the time when the pulse signal P1 is output from the comparator circuit 14 to the time when the pulse signal P2 is output is output to the spacer thickness measuring circuit 16.

The number of counted clock signals is a number of clocks obtained in a period shown by "T" in FIG. 4 and the number is proportional to the thickness of the spacer section S. Therefore, by determining thicknesses of the spacer section S corresponding to numbers of clocks in advance, it is possible to recognize the thickness of the spacer section S as data. When the data indicating the thickness of the spacer section S is output from the spacer thickness measuring circuit 16 to the controller circuit 13, the amount of defocus stored in the memory circuit 17 corresponding to the data is read and a setting operation is performed with respect to the focus servo circuit 11 for performing a focus servo operation based on the amount of defocus.

It is possible to accurately perform a focus control operation with respect to the second recording layer L2 by performing the setting operation of the amount of defocus with respect to the focus servo circuit 11. As a result, the reproducing operation of a signal recorded on the second recording layer L2 and the recording operation of signals onto the second recording layer L2 can be performed in an optimum state.

In the above-described structure, the thickness of the spacer section S is measured by displacing the objective lens 3 from a position distant from the surface of the optical disk 1 in a direction toward the optical disk 1. Alternatively, it is also possible to measure the thickness of the spacer section S by displacing the objective lens 3 in the opposite direction, that is, from a position near the surface of the optical disk 1 in a direction moving away from the optical disk 1. In this case, the pulse signal P2 corresponding to the second recording layer L2 is first output from the comparator circuit 14 and then, the pulse signal P1 corresponding to the first recording layer L1 is output.

When the objective lens 3 is to be displaced from a position distant from the surface of the optical disk 1 in a direction toward the optical disk 1 in order to measure the thickness of the spacer section S, it is possible to determine a starting position of displacement for the objective lens 3 for starting measurement by displacing the objective lens 3 to a position where the lens holder contacts the maximum distance position defining member 7. When, on the other hand, the objective lens 3 is to be displaced from a position near the surface of the optical disk 1 in a direction moving away from the optical disk 1 in order to measure the thickness of the spacer section S, it is possible to determine the displacement starting position of the objective lens 3 for measuring the spacer thickness by displacing the objective lens 3 to a position where the lens holder contacts the minimum distance position defining member 8.

The measurement operation between the pulse signal P1 and the pulse signal P2 is performed in the above-described manner by the counter circuit 15 to measure the thickness of the spacer section S. A different method of measuring will now be described.

When the objective lens 3 is moved from a position defined by the maximum distance position defining member 7 in a direction toward the surface of the optical disk 1 in order to measure the thickness of the spacer section S, the pulse signal P1 and the pulse signal P2 are output from the comparator circuit 14.

When the objective lens 3 starts to move from the maximum distance position, the count operation of the clock signal by the counter circuit 15 is started so as to count a number of clock signals that are counted until the pulse signal P1 is output and count a number of clock signals until the pulse signal P2 is output.

With the counting of the clock signals, it is possible to measure the number C1 of clocks that are counted during a period T1 in which the objective lens 3 is moved from the maximum distance position to the position of the first recording layer L1 and the number C2 of clocks that are counted during a period T2 in which the objective lens 3 is moved to the position of the second recording layer L2. Therefore, it is possible to calculate the number of clocks that are counted during a period T between the first pulse signal P1 and the second pulse signal P2 from (C2-C1).

The number of clocks calculated in this manner is proportional to the thickness of the spacer section S. It is therefore possible to recognize the thickness of the spacer section S as data, by determining thicknesses of the spacer section S corresponding to numbers of clocks in advance. When the data indicating the thickness of the spacer section S is output from the spacer thickness measuring circuit 16 to the controller circuit 13, an amount of defocus which is stored in the memory circuit 17 corresponding to the data is read so that a setting operation can be performed with respect to the focus servo circuit 11 for performing the focus servo operation based on the amount of defocus.

The thickness of the spacer section S can be measured by moving the objective lens 3 from a position defined by the maximum distance position defining member 7 in a direction toward the surface of the optical disk 1. Alternatively, it is also possible to measure the thickness of the spacer section S by moving the objective lens 3 from a position defined by the minimum distance position defining member 8 in a direction moving away from the surface of the optical disk 1.

In the present embodiment, an optical disk having two recording layers is exemplified, but the present embodiment is not limited to a two-layer structure and may be applied to an optical disk recording and reproducing device which uses an optical disk having three or more recording layers.

Second Preferred Embodiment

In a second preferred embodiment of the present invention, an amount of defocus for performing the focus servo operation is set by measuring a thickness of a spacer section present between a first recording layer and a second recording layer.

Figure 5:
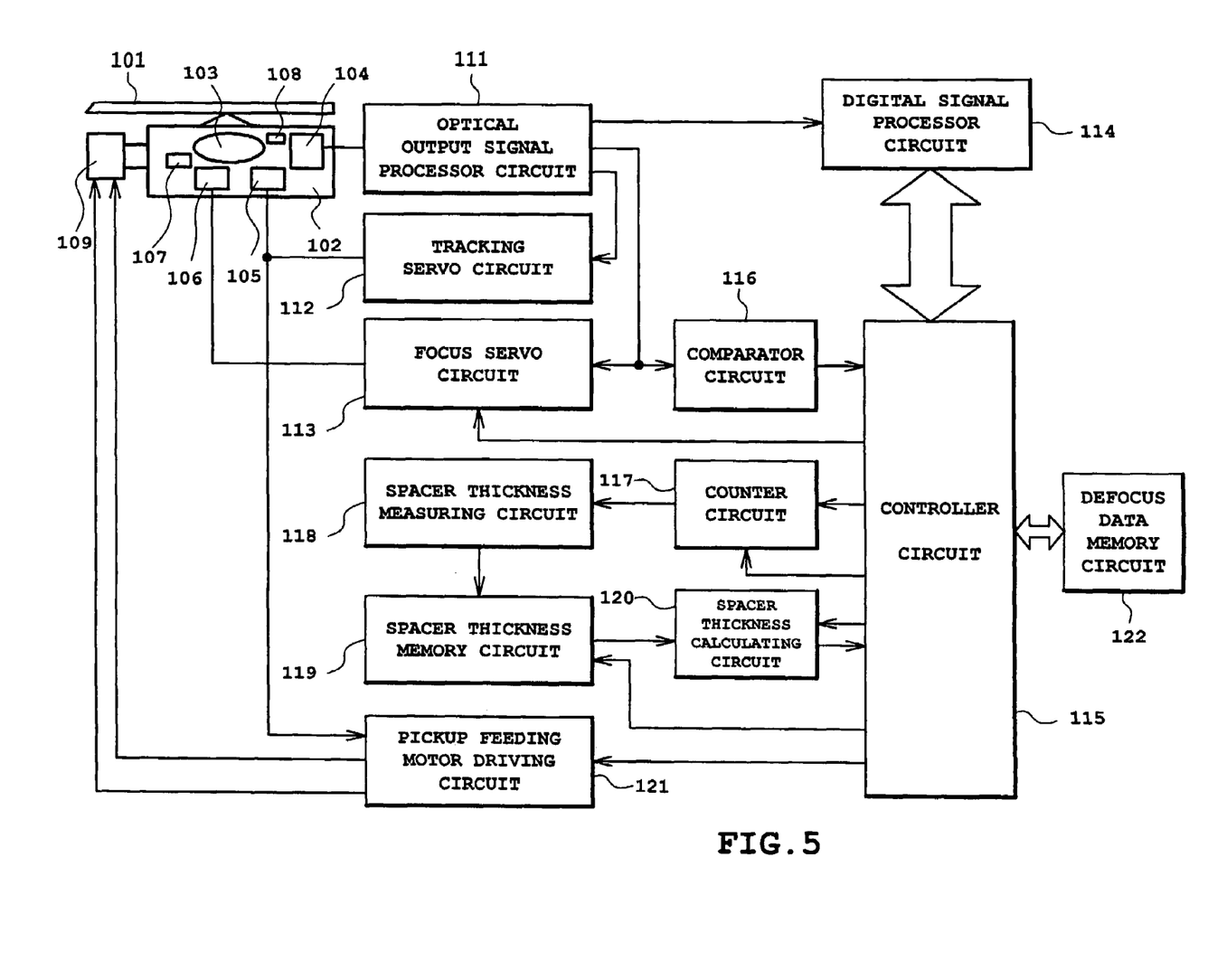
FIG. 5 is a block circuit diagram showing an optical disk recording and reproducing device according to a second preferred embodiment of the present invention.

FIG. 5 is a block circuit diagram showing an optical disk recording and reproducing device according to the second preferred embodiment of the present invention.

Referring to FIG. 5, an optical disk 101 is constructed to be rotationally driven by a spindle motor (not shown) so that the rotation is controlled such that, for example, the linear velocity is constant. As shown in FIG. 2, a first recording layer L1 and a second recording layer L2 are provided on the optical disk 101. An optical pickup device 102 comprises a laser diode (not shown) which emits laser light, an objective lens 3 for focusing the laser light irradiated from the laser diode to the recording layer of the optical disk 101, an optical detector 104, comprising a quadrant sensor or the like, which receives the laser light reflected from the optical disk 101 and converts the laser light into an electrical signal, a tracking coil 105 for displacing the objective lens 103 along a radial direction of the optical disk 101, and a focusing coil 106 for displacing the objective lens 103 in a direction perpendicular to a signal plane of the optical disk 101.

A maximum distance position defining member 107 contacts a lens holder (not shown) which supports the objective lens 103 when the objective lens 103 is furthest away from the surface of the optical disk 101 due to a supply operation of a drive signal to the focusing coil 106. The maximum distance position defining member 107 is provided to control a maximum distance position of the objective lens 103 with respect to the optical disk 101. A minimum distance position defining member 108 contacts the lens holder which supports the objective lens 103 when the objective lens 103 approaches closest to the surface of the optical disk 101 due to a supply operation of a drive signal to the focusing coil 106. The minimum distance position defining member 108 is provided to control the minimum distance position of the objective lens 103 with respect to the optical disk 101.

A pickup feeding motor 109 moves the optical pickup device 102 along a radial direction of the optical disk 101. The pickup feeding motor 109 is constructed to move the optical pickup device 102 by rotationally driving a feed shaft 110 having a feeding channel formed at its periphery.

An electrical signal obtained from the optical detector 104 is input to an optical output signal processor circuit 111 as an optical signal. The optical output signal processor circuit 111 is constructed to generate a tracking error signal which indicates a deviation of laser light from a signal track, a focus error signal which indicates a deviation in focus of the laser light with respect to the recording layer, and a replay signal which is a read signal of the signal recorded on the optical disk 101. The operations to generate various signals in the optical output signal processor circuit 111 are performed by known circuits and will not be described in detail.

A tracking servo circuit 112 receives the tracking error signal generated by and output from the optical output signal processor circuit 111. The tracking servo circuit 112 is constructed to perform a tracking servo operation by supplying a tracking coil drive signal to the tracking coil 105 based on the input tracking error signal. A focus servo circuit 113 receives the focus error signal generated by and output from the optical output signal processor circuit 111. The focus servo circuit 113 is constructed to perform a focus servo operation by supplying a focus coil drive signal to the focusing coil 106 based on the input focus error signal.

A digital signal processor circuit 114 receives a replay signal which is binarized by a binarization circuit provided within the optical output signal processor circuit 111. The digital signal processor circuit 114 performs a digital signal processing. The digital signal processor circuit 114 is constructed to decode various recorded signals such as the synchronization signal and positional information data. A controller circuit 115 controls various operations of the optical disk recording and reproducing device. The controller circuit 115 is constructed to control a rotation control operation of the optical disk 101 by the spindle motor and processing operations of the replay signal and the recording signal using a synchronization signal generated by the digital signal processor circuit 114 and transmission/reception operations of signals to and from a host device such as a personal computer which is externally provided. The controller circuit 115 is formed by a microcomputer and is constructed to perform various control operations based on program software stored in a flash ROM or the like which is provided internally.

A comparator circuit 116 receives the focus error signal output from the optical output signal processor circuit 111.

The comparator circuit 116 is constructed to output, to the controller circuit 115, a signal of H (high) level for a period when the level of the focus error signal exceeds a threshold value VR. A graph (A) in FIG. 3 shows a relationship between the focus error signal and the threshold value VR which is obtained when the objective lens 103 is moved to approach from a position distant from the recording layer provided on the optical disk 101. As is known in the art, the focus error signal changes in an S-shape. When the optical disk 101 comprises two layers, two S-shaped changes occur. A graph (B) in FIG. 3 shows a pulse signal output from the comparator circuit 116, and a signal of H level is output for a period in which the level of the focus error signal exceeds the threshold value VR.

An operation of a counter circuit 117 is controlled by the controller circuit 115. The counter circuit 117 is constructed to start a counting operation when a pulse signal is output from the comparator circuit 116 and to measure a period between a first pulse signal and a next pulse signal when the next pulse signal is output. For example, it is possible to provide a clock signal generating circuit which generates a clock signal of a predetermined frequency and measure the period using a number of clock signals which are counted between the pulse signals.

A spacer thickness measuring circuit 118 determines a thickness of a spacer section S provided between the first recording layer L1 and the second recording layer L2 based on a number of clock signals counted by the counter circuit 117. The spacer thickness measuring circuit 118 can determine the spacer thickness from a relationship between the number of clock signals and the thickness which is determined in advance. Data indicating the determined spacer thickness is output to a spacer thickness memory circuit 119 in which the recording operation and reading operation of a signal is controlled by the controller circuit 115. The spacer thickness memory circuit 119 is constructed to store data indicating the spacer thickness output from the spacer thickness measuring circuit 118.

When the spacer thickness is measured by the spacer thickness measuring circuit 118 and the data is stored in the spacer thickness memory circuit 119, the pickup feeding motor 109 is rotated to move the position of the optical pickup device 102 in, for example, a direction toward an outer periphery on the optical disk 101 to measure the thickness of the spacer section S. In this manner, data of the measured spacer thickness is input to the spacer thickness memory circuit 119 and stored in the spacer thickness memory circuit 119.

An operation of a spacer thickness calculating circuit 120 is controlled by the controller circuit 115. The spacer thickness calculating circuit 120 is constructed to calculate an average value of a plurality of spacer thickness data stored in the spacer thickness memory circuit 119 and output the value determined in the calculation to the controller circuit 115 as data indicating the thickness of the spacer section S present between the first recording layer L1 and the second recording layer L2 of the optical disk 101.

A pickup feeding motor driving circuit 121 rotationally drives the pickup feeding motor 109. The pickup feeding motor driving circuit 121 is constructed to perform an operation to very slightly move the body of the optical pickup device 102 by rotating the pickup feeding motor 109 in a predetermined manner when a level of a DC current of the tracking drive signal output from the tracking servo circuit 112 reaches a predetermined value and a drive operation to significantly move the body of the optical pickup device 102 such as a search operation.

An operation of a defocus data memory circuit 122 is controlled by the controller circuit 115. The defocus data memory circuit 122 stores, as table data, data indicating an amount of defocus with respect to the thickness of the spacer section S. A control operation of focus of laser light irradiated from the optical pickup device 102 to the optical disk 101 will now be described. When a focus coil drive signal is supplied from the focus servo circuit 113 to the focusing coil 106, the objective lens 103 is displaced in a direction perpendicular to the plane of the optical disk 101 and a focus error signal having an S-shape as shown in the graph (A) of FIG. 3 is generated by and output from the optical output signal processor circuit 111. A zero-cross point F of the S-shaped focus error signal is the point where it is determined that the laser light irradiated on the optical detector 104 is focused from the irradiated spot of the laser light. However, it is not possible to ensure that this point is an optimum focus point with respect to the recording layer of the optical disk 101.

Specifically, the zero-cross point F of the S-shaped focus error signal may not be an optimum focus point with respect to the recording layer of the optical disk 101 because of a deviation in positional relationship between the optical disk 101 which is placed on a turntable (not shown) and the optical pickup device 102, or a difference in mounting position of various optical components in the optical pickup device 102 and the optical detector 104. In order to improve this point, a setting operation for shifting the focusing point to the best position for performing the focus servo operation by the focus servo circuit 113, that is, a setting operation of an amount of defocus, is performed. The setting operation of the amount of defocus is performed by the controller circuit 115 controlling the focus servo circuit 113.

FIG. 2A is a diagram showing a state in which the focus control operation with respect to the first recording layer L1 is performed. The laser light focused by the objective lens 103 is focused on the first recording layer L1 through a cover layer C. FIG. 2B shows a state in which a focus control operation with respect to the second recording layer L2 is performed. The laser light focused by the objective lens 103 is focused on the second recording layer L2 through the cover layer C, the first recording layer L1, and the spacer section S.

The cover layer C has an approximate predetermined thickness and an amount of defocus with respect to the first recording layer L1 is set using a test disk which forms a standard during manufacturing of the optical disk recording and reproducing device. It is possible to set the amount of defocus with respect to the first recording layer L1 by adjusting the level of the drive signal to be supplied to the focusing coil 106 so that a level of a replay signal obtained from the optical detector 104 to which the laser light reflected from the test disk is irradiated is maximized. This is because as the level of the laser light reflected from the test disk is increased, the level of the replay signal is increased and the level of the reflected laser light is maximized when the focus with respect to the first recording layer is in an optimum state. Similarly, it is also possible to set the amount of defocus with respect to the first recording layer L1 by adjusting the level of the drive signal to be supplied to the focusing coil 106 so that a jitter value included in the replay signal obtained from the test disk is minimized. This is because the jitter value is minimized when the focus with respect to the first recording layer L1 is in the optimum state.

When the focus characteristics with respect to the recording operation are to be considered in addition to the setting of the amount of defocus by the above-described method, it is possible to record test signals while changing the amount of defocus with respect to the first recording layer L1 and to set, as an optimum amount of defocus with respect to the first recording layer L1, an amount of defocus which allows recording of a test signal maximizing the β value which is calculated based on a level of an RF signal obtained by reproducing the recorded signal. Specifically, the β value is calculated as $\beta=(A1+A2)/(A1-A2)$ when the positive peak level of the RF signal which is the replay signal of the signal recorded on the first recording layer L1 is A1 and the negative peak level of the RF signal is A2. There is a tendency for the signal to be recorded with a better focus as the β value increases. Therefore, in order to obtain the best focus, it is possible to set the amount of defocus so that the β value is maximized.

A setting operation of the amount of defocus with respect to the second recording layer L2 is performed in a similar manner to the setting operation of the amount of defocus with respect to the first recording layer L1. A relationship between the thickness of the spacer section S present between the first recording layer L1 and the second recording layer L2 and the amount of defocus is detected and an operation to store, in the defocus data memory circuit 122, data which indicates an amount of correction with respect to the thickness is performed during manufacture of the optical disk recording and reproducing device.

The setting operation of the amount of defocus is performed in a manner described above. Next, an operation for measuring the thickness of the spacer section S will be described. A first operation for measuring the thickness of the spacer section S is to rotationally drive the pickup feeding motor 109 to move the optical pickup device 102 into a read-in region provided at a radially inner side of the optical disk 101. An operation to detect a position of the read-in region can be performed by reading positional information data recorded on the optical disk 101. Here, it is also desirable to set the position for measuring the thickness of the spacer section based on a number of rotations of the pickup feeding motor 109 for performing the feeding operation of the optical pickup device along the radial direction.

After the optical pickup device 102 is moved to the read-in region, a focus driving signal for measuring the thickness of the spacer section S is supplied from the focus servo circuit 113 to the focusing coil 106. The driving signal is supplied to move the objective lens 103 along a direction toward the surface of the optical disk 101 after a signal is supplied for temporarily moving the objective lens 103 in a direction moving away from the surface of the optical disk 101.

When this operation is performed, the objective lens 103 is moved from a position distant from the surface of the optical disk 101 in a direction toward the optical disk 101 while the laser light generated by the laser diode continues to be irradiated. Every time the focus point of the laser light passes the first recording layer L1 and the second recording layer L2, the focus error signal as shown in graph (A) of FIG. 3 is output from the optical output signal processor circuit 111 and a pulse signal as shown in graph (B) of FIG. 3 is output from the comparator circuit 116. In this manner, the spacer thickness is measured by moving the objective lens 103 in a direction perpendicular to the plane of the optical disk 101 and measuring a period between pulse signals obtained by binarizing the focus error signal using a predetermined threshold value.

FIG. 4 shows a relationship of pulse signals output from the comparator circuit 116 when the objective lens 103 is displaced from a position distant from the optical disk 101 to a position near the optical disk 101 in order to measure the thickness of the spacer section S. A pulse signal P1 corresponds to the first recording layer L1 and a pulse signal P2 corresponds to the second recording layer L2.

When the pulse signal P1 is output from the comparator circuit 116, a control operation of the counter circuit 117 by the controller circuit 115 is performed, and as a result, the counter circuit 117 starts to count a number of clock signals output from the clock signal generating circuit. When the next pulse signal P2 is output from the comparator circuit 116 while the counting operation is performed, a control operation of the counter circuit 117 by the controller circuit 115 is performed. Specifically, the counting operation of the clock signals by the counter circuit 117 is stopped and the number of clock signals that are counted from the time when the pulse signal P1 is output from the comparator circuit 116 to the time when the pulse signal P2 is output is output to the spacer thickness measuring circuit 118.

The counted number of clocks corresponds to a number of clocks obtained in a period shown by "T" in FIG. 4 and is proportional to the thickness of the spacer section S. It is therefore possible to recognize the thickness of the spacer section S as data by determining thicknesses of the spacer section S corresponding to numbers of clocks in advance. Data indicating the thickness of the spacer section S is output from a spacer thickness measuring circuit 118 to the spacer thickness memory circuit 119.

When the data indicating the thickness of the spacer section S is output from the spacer thickness measuring circuit 118 and is input to the spacer thickness memory circuit 119, the spacer thickness memory circuit 119 performs an operation to store, as first data, the position where the thickness is measured and the data indicating the thickness.

When the first data is stored in the spacer thickness memory circuit 119, the optical pickup device 102 is moved by a rotational driving operation of the pickup feeding motor 109 to a read-out region provided at a radially outer position of the optical disk 101. A position detecting operation of the read-out region can be performed by reading positional information data recorded on the optical disk 101.

When the optical pickup device 102 is moved to the read-out region, a focus drive signal for measuring the thickness of the spacer section S is supplied from the focus servo circuit 111 to the focusing coil 106. In this case also, the drive signal is supplied to move the objective lens 103 along a direction toward the surface of the optical disk 101 after a signal is supplied for temporarily moving the objective lens 103 in a direction departing from the surface of the optical disk 101.

When this operation is performed, the objective lens 103 is moved from a position distant from the surface of the optical disk 101 in a direction toward the optical disk 101 while the laser light generated by the laser diode continues to be irradiated. Similar to the above-described operations, every time the focus point of the laser light passes the first recording layer L1 and the second recording layer L2, the focus error signal as shown in graph (A) of FIG. 3 is output from the optical output signal processor circuit 111 and a pulse signal as shown in graph (B) of FIG. 3 is output from the comparator circuit 116.

As shown in FIG. 4, a pulse signal P1 corresponding to the first recording layer L1 and a pulse signal P2 corresponding to the second recording layer L2 are output from the comparator circuit 116. When the pulse signal P1 and the pulse signal P2 are output from the comparator circuit 116, the counter circuit 117 performs a counting operation to count a number of clock signals between the pulse signal P1 and the pulse signal P2, that is, the period shown by "T" in FIG. 4.

The number of clock signals thus counted constitutes data indicating the thickness of the spacer section S and the data indicating the thickness is output from the spacer thickness measuring circuit 118 to the spacer thickness memory circuit 119. When the data indicating the thickness of the spacer section S is output from the spacer thickness measuring circuit 118 and is input to the spacer thickness memory circuit 119, the spacer thickness memory circuit 119 stores, as second data, the data indicating the position where the thickness is measured, and the thickness.

When the first data, which is the thickness data of the read-in region, and the second data, which is the thickness data of the read-out region, are stored in the spacer thickness memory circuit 119, the spacer thickness calculating circuit 120 calculates an average value. When the spacer thickness calculating circuit 120 performs the calculation process operation, the average value obtained from the first data and the second data is output to the controller circuit 115 as the data indicating the thickness of the spacer section S.

When the data indicating the thickness of the spacer section S is input to the controller circuit 115, an amount of defocus stored in the defocus data memory circuit 122 is read corresponding to the input data, and a setting operation is performed with respect to the focus servo circuit 113 for a focus servo operation based on the amount of defocus.

It is possible to accurately perform a focus control operation with respect to the second recording layer L2 by performing the setting operation of the amount of defocus with respect to the focus servo circuit 113. As a result, the reproducing operation of a signal recorded on the second recording layer L2 and the recording operation of signals onto the second recording layer L2 can be performed in an optimum state.

In the above-described structure, the thickness of the spacer section S in the read-in region or in the read-out region is measured by displacing the objective lens 103 from a position distant from the surface of the optical disk 101 in a direction toward the optical disk 101. Alternatively, it is also possible to measure the thickness of the spacer section S by displacing the objective lens 103 in the opposite direction, that is, from a position near the surface of the optical disk 101 in a direction moving away from the optical disk 101. In this case, the pulse signal P2 corresponding to the second recording layer L2 is first output from the comparator circuit 116, and then the pulse signal P1 corresponding to the first recording layer L1 is output.

When the objective lens 103 is to be displaced from a position distant from the surface of the optical disk 101 in a direction toward the optical disk 101 in order to measure the thickness of the spacer section S, it is possible to determine a starting position of displacement for the objective lens 103 for starting measurement by displacing the objective lens 103 to a position where the lens holder contacts the maximum distance position defining member 7. When, on the other hand, the objective lens 103 is to be displaced from a position near the surface of the optical disk 101 in a direction moving away from the optical disk 101 in order to measure the thickness of the spacer section S, it is possible to determine the displacement starting position of the objective lens 103 for measuring the spacer thickness by displacing the objective lens 103 to a position where the lens holder contacts the minimum distance position defining member 108.

The measurement operation between the pulse signal P1 and the pulse signal P2 is performed in the above-described manner by the counter circuit 117 to measure the thickness of the spacer section S. A different method of measuring will now be described.

When the objective lens 103 is moved from a position defined by the maximum distance position defining member 107 in a direction toward the surface of the optical disk 101 in order to measure the thickness of the spacer section S, the pulse signal P1 and the pulse signal P2 are output from the comparator circuit 116.

When the objective lens 103 starts to move from the maximum distance position, the count operation of the clock signal by the counter circuit 117 is started to count a number of clock signals until the pulse signal P1 is output and a number of clock signals until the pulse signal P2 is output.

With the counting of the clock signals, it is possible to measure the number C1 of clocks that are counted during a period T1 in which the objective lens 103 is moved from the maximum distance position to the position of the first recording layer L1 and the number C2 of clocks that are counted during a period T2 in which the objective lens 103 is moved to the position of the second recording layer L2. It is therefore possible to calculate the number of clocks that are counted during a period T between the first pulse signal P1 and the second pulse signal P2 from (C2-C1).

The number of clocks calculated in this manner is proportional to the thickness of the spacer section S. It is therefore possible to recognize the thickness of the spacer section S as data, by setting thicknesses of the spacer section S corresponding to numbers of clocks in advance. When the data indicating the thickness of the spacer section S is output from the spacer thickness measuring circuit 118 to the spacer thickness memory circuit 119, the first data and the second data are stored in the spacer thickness memory circuit 119.

When the first data and the second data are stored in the spacer thickness memory circuit 119, the spacer thickness calculating circuit 120 performs a calculation and the calculated average value is output to the controller circuit 115 as the thickness data of the spacer section S. As a result, the controller circuit 115 reads the amount of defocus stored in the defocus data memory circuit 122 corresponding to the input data and can perform a setting operation of the focus servo circuit 113 in order to perform a focus servo operation based on the amount of defocus.

The thickness of the spacer section S can be measured by moving the objective lens 103 from a position defined by the maximum distance position defining member 107 in a direction toward the surface of the optical disk 110. Alternatively, it is also possible to measure the thickness of the spacer section S by moving the objective lens 103 from a position defined by the minimum distance position defining member 108 in a direction departing from the surface of the optical disk 101.

In the present embodiment, the thickness of the spacer section S is measured in the read-in region and in the read-out region. The positions for measuring the thickness are not limited to this configuration and may be arbitrarily set as long as the positions are at a radially inner position and at a radially outer position. In addition, although measurement of the thickness of the spacer section S at two positions, one at a radially inner position and another at a radially outer position, is described in the embodiment, it is also possible to measure the thickness of the spacer section S at three or more positions. In this case, it is possible to perform various operations as the calculation process using the spacer thickness calculating circuit 120 such as, for example, a process of summing all data and calculating the average value and a process of determining an average using a maximum value and a minimum value.

In the present embodiment, the displacement operation of the optical pickup device 102 to a position for measuring the thickness of the spacer section S is performed using the positional information data obtained from the optical disk 101. Alternatively, it is also possible to determine a displacement distance of the optical pickup device 102 from, for example, an output time of the drive signal output from the pickup feeding motor driving circuit 121 and a number of rotation pulse signals obtained from the pickup feeding motor 109 and to measure the thickness of the spacer section S based on the determined displacement distance.

In the present embodiment, an optical disk having two recording layers is exemplified, but the present embodiment is not limited to a two-layer structure and may be applied to an optical disk recording and reproducing device which uses an optical disk having three or more recording layers.

As described, in the present embodiment, a thickness of the spacer section between the first recording layer and the second recording layer is measured at two or more locations, the spacer thickness is determined from an average value of the plurality of measured spacer thicknesses, the amount of defocus with respect to the second recording layer is set based on the determined spacer thickness, and the focus servo operation is performed for focusing the laser light irradiated from the optical pickup device on the second recording layer. Because of this structure, it is possible to accurately perform a focus control operation.

In addition, in the present embodiment, the objective lens is moved in a direction perpendicular to the plane of the optical disk, the focus error signal generated from the optical detector is binarized using a predetermined threshold value to obtain pulse signals, and a period between the pulse signals is measured to determine the spacer thickness. Because of this structure, it is possible to easily measure the thickness of the spacer section.

What is claimed is:

1. A method of controlling focus in an optical disk recording and reproducing device which uses an optical disk having at least a first recording layer and a second recording layer and which performs a recording operation and a reproducing operation of a signal using laser light irradiated from a side of the first recording layer, wherein
   a thickness of a spacer section between the first recording layer and the second layer is measured;
   an amount of defocus with respect to the second recording layer is set based on the measured spacer thickness;
   a memory circuit is provided which stores the amount of defocus that corresponds to the spacer thicknesses; and
   a focus servo operation is performed to focus laser light irradiated from an optical pickup device on the second recording layer at the amount of defocus that corresponds to the measured spacer thickness and read from the memory circuit.

2. A method of controlling focus in an optical disk recording and reproducing device which uses an optical disk having at least a first recording layer and a second recording layer and which performs a recording operation and a reproducing operation of a signal using laser light irradiated from a side of the first recording layer, wherein
   a thickness of a spacer section between the first recording layer and the second recording layer is measured at two or more locations on the optical disk;
   a spacer thickness is determined from an average value of the two or more measured spacer thicknesses;
   an amount of defocus with respect to the second recording layer is set based on the determined spacer thickness; and
   a focus servo operation is performed to focus laser light irradiated from an optical pickup device on the second recording layer.

3. A method of controlling focus according to claim 2, wherein
the locations for measuring the thickness of the spacer section are set at least at a radially inner position on the optical disk and at a radially outer position on the optical disk.

4. A method of controlling focus according to claim 2, wherein
the locations for measuring the thickness of the spacer section are set based on positional information data obtained from the optical disk.

5. A method of controlling focus according to claim 2, wherein
the locations for measuring the thickness are set based on a number of rotations of a pickup feeding motor which feeds the optical pickup device in a radial direction.

6. A method of controlling focus according to claim 1, wherein
an objective lens is moved in a direction vertical to a plane of the optical disk to generate a focus error signal from an optical detector; and
a period between pulse signals obtained by binarizing the focus error signal using a predetermined threshold value is measured to measure the spacer thickness.

7. A method of controlling focus according to claim 6, wherein
a counter circuit is provided which starts a counting operation of a clock signal when a first pulse signal is obtained; and
the spacer thickness is measured based on a number of clock signals counted until a next pulse signal is obtained.

8. A method of controlling focus according to claim 6, wherein
the focus error signal is generated by moving the objective lens from a position distant from the optical disk in a direction toward the surface of the optical disk.

9. A method of controlling focus according to claim 8, wherein
a maximum distance position defining member is provided which defines a position in which the objective lens is furthest away from the surface of the optical disk; and
the objective lens is moved from a maximum distance position defined by the maximum distance position defining member in a direction toward the surface of the optical disk.

10. A method of controlling focus according to claim 6, wherein
a maximum distance position defining member is provided which defines a position where the objective lens is furthest away from the surface of the optical disk;
a counter circuit is provided which starts a counting operation of a clock signal when a movement of the objective lens from the maximum distance position is started; and
the spacer thickness is measured based on a difference between a number of clock signals counted until a second pulse signal is obtained and a number of clock signals counted until an initial pulse signal is obtained.

11. A method of controlling focus according to claim 6, wherein
the focus error signal is generated by moving the objective lens from a position near the optical disk in a direction departing from the surface of the optical disk.

12. A method of controlling focus according to claim 11, wherein
a minimum distance position defining member is provided which defines a position of the objective lens closest to the surface of the optical disk, and the objective lens is moved from a minimum distance position defined by the minimum distance position defining member in a direction departing from the surface of the optical disk.

13. A method of controlling focus according to claim 6, wherein
a minimum distance defining member is provided which defines a position where the objective lens is closest to the surface of the optical disk;
the objective lens is moved from a minimum distance position defined by the minimum distance position defining member in a direction departing from the surface of the optical disk;

a counter circuit is provided which starts a counting operation of a clock signal when movement of the objective lens from the minimum distance position is started; and the spacer thickness is measured based on a difference between a number of clock signals counted until a second pulse signal is obtained and a number of clock signals counted until an initial pulse signal is obtained.

* * * * *